UNITED STATES PATENT OFFICE.

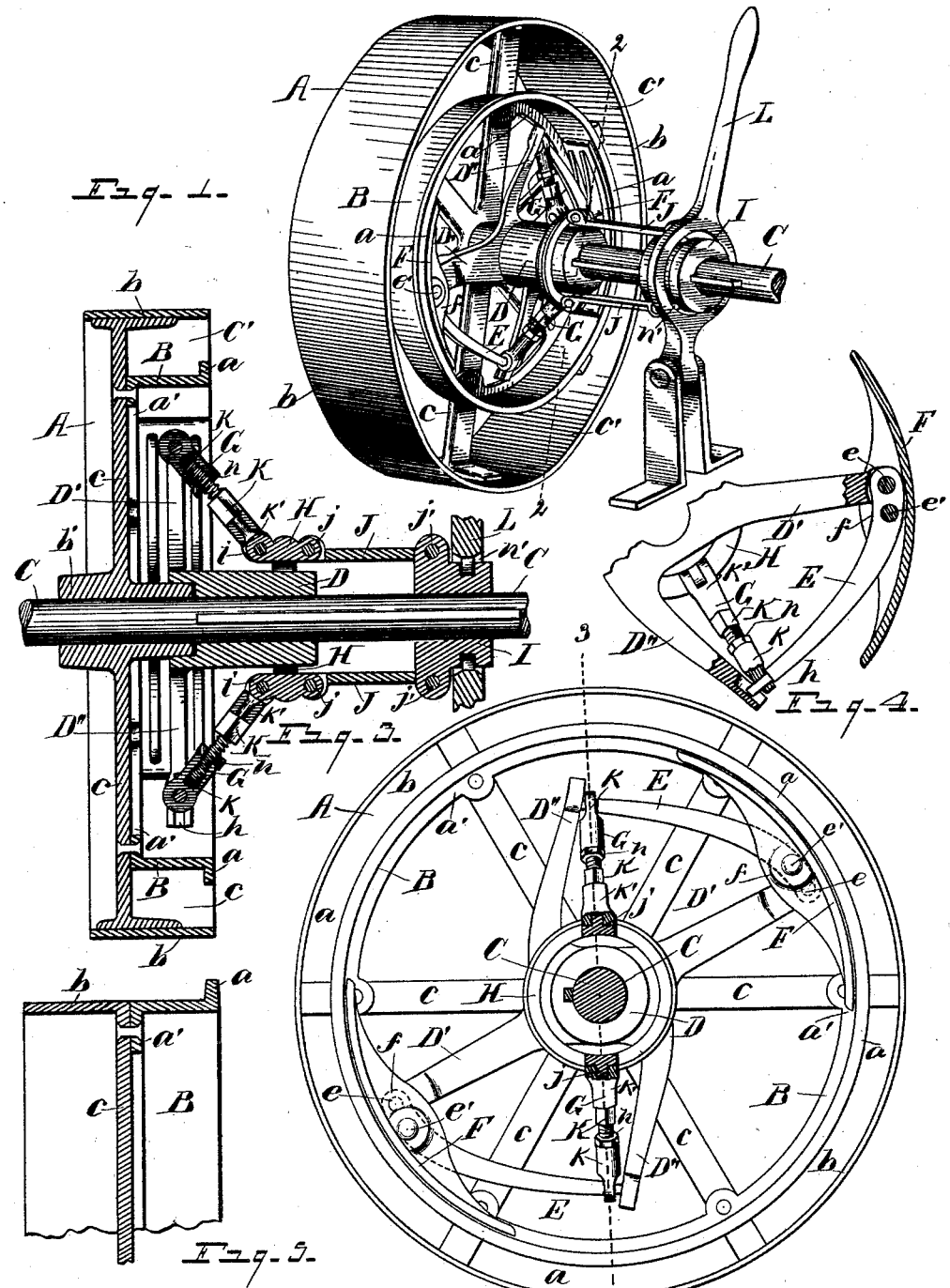

SYLVESTER P. BABCOCK, OF ADRIAN, MICHIGAN.

CLUTCH.

SPECIFICATION forming part of Letters Patent No. 519,899, dated May 15, 1894.

Application filed September 15, 1892. Renewed April 14, 1894. Serial No. 507,606. (No model.)

*To all whom it may concern:*

Be it known that I, SYLVESTER P. BABCOCK, a citizen of the United States, residing at Adrian, in the county of Lenawee, State of Michigan, have invented certain new and useful Improvements in Friction-Clutch Pulleys; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in friction clutch pulleys, and consists in a certain construction and arrangement of parts as hereinafter fully set forth, the essential features of which being pointed out particularly in the claims.

The object of this invention is to provide a simple, cheap and effectual friction clutch for use in connection with a revoluble shaft carrying a loose pulley thereon, whereby said pulley may be thrown into or out of gear with said shaft, while in motion, or at will, in which the parts are so constructed and arranged as to obviate the necessity of accurate adjustments to insure their successful operation, and are so located within the rim or body of the pulley, as to offer no resistance thereto, by the air-pressure while in motion, thus occupying but a small space on the shaft outside of that required by the pulley. These objects are attained by the mechanism illustrated in the accompanying drawings, in which—

Figure 1 is a perspective view of my improved friction clutch pulley. Fig. 2 is a front elevation, in section on dotted line 2—2 of Fig. 1. Fig. 3 is a central vertical section of Fig. 2 on dotted line 3—3 thereof. Fig. 4 is a detail partly in section of the friction shoe and actuating levers. Fig. 5 is a detail in section, showing a modified form of connecting the friction ring with the pulley rim.

Referring to the letters of reference, A is the pulley, which is of the usual form, except that the rim $b$ projects a greater distance beyond the spokes $c$ and the hub $b'$ at one side than at the other, thus forming an open space $C'$ within said rim between its vertical face and the spokes $c$. Located within said space concentric with the hub and flush with the rim of the pulley is the friction ring B, having the reversed peripheral flanges $a$, $a'$, formed respectively on the outer and inner edges thereof, said flanges serving to strengthen the ring against centrifugal force and the strain of the friction-shoes which bear against the inner face thereof. Said ring B is secured to the spokes or spider of the pulley A by bolts or rivets which pass therethrough and through the flange $a'$ of said ring, as clearly shown in Figs. 1 and 3.

C is a shaft on which the pulley A is loosely mounted, and keyed or splined upon said shaft adjacent to and embracing the inner end of the hub $b'$, is an auxiliary hub or spider D having the diametrical or radial arms D' and tangent arms D'' projecting therefrom and in line with the horizontal center of the friction ring B.

E, E are levers which extend from the outer ends of the radial arms D' to the outer ends of the tangent arms D'' in reverse directions. The outer ends of said levers are pivoted at $e$ to the arms D', and are also pivoted at $e'$ centrally to and between the ribs $f$ of the friction shoes F. The opposite ends thereof are received by and adapted to reciprocate in the grooves or guide-ways $h$ formed in the opposed edges of the arms D'' at the ends thereof, as clearly shown in Figs. 2 and 4.

G, G are adjustable couplings composed of the end links $k$ and $k'$ which are connected by the square shanked stem K, one end of which is swiveled in the link $k'$, its opposite end being screw threaded in the link $k$ and provided with the jamb-nut $n$, whereby, by turning said stem the coupling may be lengthened or shortened as desired. See Fig. 3. Said couplings are connected each at one end to the free ends of the levers E adjacent the tangent arms D'', their opposite ends being pivoted at $i$ to the shifting ring H, which ring is also connected to the sliding collar I, by means of the parallel links J, whose ends are pivoted at $j$ and $j'$ to said ring and collar, respectively. The shifting ring H encircling the hub D is of greater diameter than said hub, and does not come in contact therewith, but is supported entirely upon the couplings G, G, which, when not in service stand on an inclined or diverging line therewith, as shown in Figs. 1 and 3. The collar I is splined to and adapted to slide on the shaft C, being actuated by the hand-lever I, which is fulcrumed to a suitable stationary support and encircles the collar I, having suitable lugs thereon which enter the annular recess n' formed centrally in said collar, whereby the lever has continuous contact with the collar, permitting the same to revolve with the shaft, as does also the entire clutch mechanism, with the exception of the friction ring B that is secured to the pulley A which is loosely mounted upon said shaft. By this construction, when the hand-lever L is shifted in the direction of the pulley, the collar I, links J and ring H will be forced horizontally toward the center of said pulley, sufficiently to carry the couplings G from an inclined to an upright position during which time the outer ends of said coupling, carrying the free ends of the levers E, move in a diametrical line and swing said levers in the arc of a circle from their pivotal or fulcrum point, thus forcing the friction shoes against the inner face of the ring B, forming a contact of great resistance and causing the pulley to revolve with the shaft, until released by a reverse movement of the lever, when the parts will be disengaged as will be readily understood.

It should be understood, that in adjusting the couplings G to increase or decrease the tension or pressure desired on the shoes, accuracy in the equal adjustment of said couplings need not be observed to any great extent, for, should one coupling exceed the other in height, the ring H, being capable of lateral movement, will shift to the side having the shorter coupling, thus compensating for the deficiency therein and equalizing the pressure of the shoes on the ring.

In Fig. 5 I show the friction or pressure ring B and pulley rim b secured together with their peripheries flush on a right line, instead of locating the former within the latter as described. This construction is desirable in some instances as it enables the periphery of the friction rim to be utilized as a belt rim in connection with the rim of the pulley.

Having thus fully set forth my invention, what I claim as new, and desire to secure by Letters Patent, is—

1. In a friction clutch pulley, the combination of the revoluble shaft, the loose pulley on said shaft carrying a friction ring, the radial arm mounted on the shaft and adapted to turn therewith, the lever pivoted to the outer end of said arm, said lever lying within the friction ring and in the same plane therewith, the shoe pivotally mounted on said lever and lying adjacent to the inner face of said friction ring, the movable ring on said shaft, the coupling connecting said ring with the outer end of said lever.

2. In a friction clutch pulley, the combination of the revoluble shaft, the loose pulley thereon, the friction ring fast to said pulley and concentric with the hub thereof, the auxiliary hub or spider mounted on the shaft and adapted to revolve therewith, said spider having radial arms, the levers pivoted to said arms, the friction shoes pivoted to said levers and standing adjacent to the inner face of said friction ring, the revoluble ring mounted on said shaft and capable of longitudinal movement thereon, the couplings connecting said ring with the levers, whereby by the adjustment of said ring said levers are actuated to throw said shoes outward against the inner face of the friction ring, or withdraw them from contact therewith, substantially as set forth.

3. In a friction clutch pulley, the combination of the shaft, the loose pulley, the friction ring fast to said pulley, the auxiliary hub or spider fast on said shaft and having the radial and tangent arms, the levers pivoted at one end to said radial arms, the other end of said levers engaging in grooves or ways in said tangential arms, the shoes pivoted to said levers, and lying adjacent to the inner face of said friction ring, the rotative and longitudinally movable ring on said shaft, the adjustable couplings connecting said ring with said levers, substantially as and for the purpose specified.

4. In a friction clutch pulley, the combination of the shaft, the loose pulley, the friction ring fast to said pulley within the rim thereof, the spider fast on said shaft and having radial arms that extend within said friction ring, the levers mounted on said radial arms, the friction shoes pivoted to said levers and adapted to bear against the inner face of the friction ring, the revoluble and longitudinally movable ring, the adjustable couplings connecting said ring with the shoe actuating levers, the collar splined upon said shaft and coupled to said ring, the lever for adjusting said collar and ring to actuate said friction shoes, substantially as set forth.

In testimony whereof I affix my signature in presence of two witnesses.

SYLVESTER P. BABCOCK.

Witnesses:
W. H. SHERMAN,
ARTHUR E. BABCOCK.